United States Patent
Schwarz et al.

(10) Patent No.: US 10,473,763 B2
(45) Date of Patent: Nov. 12, 2019

(54) LIDAR SCANNER

(71) Applicant: Uber Technologies, Inc., San Francisco, CA (US)

(72) Inventors: Brent Schwarz, Redwood City, CA (US); James A. Haslim, Dublin, CA (US); Nicholas M. Iturraran, Orinda, CA (US); Michael D. Karasoff, San Francisco, CA (US)

(73) Assignee: Uber Technologies, Inc., San Francisco, CA (US)

( * ) Notice: Subject to any disclaimer, the term of this patent is extended or adjusted under 35 U.S.C. 154(b) by 365 days.

(21) Appl. No.: 15/265,533

(22) Filed: Sep. 14, 2016

(65) Prior Publication Data

US 2017/0067985 A1 Mar. 9, 2017

Related U.S. Application Data

(63) Continuation of application No. 13/826,155, filed on Mar. 14, 2013, now Pat. No. 9,470,520.

(51) Int. Cl.
*G01S 7/48* (2006.01)
*G01C 3/08* (2006.01)
(Continued)

(52) U.S. Cl.
CPC .............. *G01S 7/4808* (2013.01); *G01C 3/08* (2013.01); *G01S 7/4818* (2013.01);
(Continued)

(58) Field of Classification Search
CPC ................................ G01S 17/93; G01S 17/06
See application file for complete search history.

(56) References Cited

U.S. PATENT DOCUMENTS 5,054,911 A 10/1991 Ohishi et al.
5,317,148 A 5/1994 Gray et al.
(Continued)

FOREIGN PATENT DOCUMENTS

| DE | 19732776 C1 | 2/1999 |
|---|---|---|
| EP | 2372389 A1 | 10/2011 |
| WO | WO 2007/012878 A1 | 2/2007 |

OTHER PUBLICATIONS

Examination Report in EP 14714039.6 dated May 15, 2017.

*Primary Examiner* — Luke D Ratcliffe
(74) *Attorney, Agent, or Firm* — Mahamedi IP Law LLP

(57) ABSTRACT

A LiDAR sensor can include a laser, a directional sensor, a window, an electromagnetic pulse receiving sensor, and a processor. The laser can be configured to emit a narrow electromagnetic pulse. Further, the directional sensor can be configured to measure the direction of the narrow electromagnetic pulse emitted by the laser. The narrow emitted electromagnetic pulse can pass through the window. The pulse can then be reflected by at least the window and an object external from the LiDAR sensor, creating at least two reflected pulses. The electromagnetic pulse receiving sensor can be configured to measure the two reflected pulses resulting from the narrow pulse emitted by the laser. The processor can be configured to receive information from the sensors, indicating a position of the object relative to the LiDAR sensor. Further, the processor can be configured to measure the intensity of the pulse being reflected by the window.

28 Claims, 8 Drawing Sheets

(51) Int. Cl.
  *G01S 17/10* (2006.01)
  *G01S 7/481* (2006.01)
  *G01S 7/486* (2006.01)
  *G01S 7/487* (2006.01)
  *G01S 7/497* (2006.01)

(52) U.S. Cl.
  CPC .......... *G01S 7/4865* (2013.01); *G01S 7/4873* (2013.01); *G01S 17/10* (2013.01); *G01S 2007/4975* (2013.01)

(56) References Cited

U.S. PATENT DOCUMENTS

| | | | |
|---|---|---|---|
| 5,463,709 A | 10/1995 | Terao et al. | |
| 5,489,149 A | 2/1996 | Akasu | |
| 5,500,520 A | 3/1996 | Komine | |
| 5,510,890 A | 4/1996 | Langdon et al. | |
| 5,515,156 A | 5/1996 | Yoshida et al. | |
| 5,553,087 A | 9/1996 | Telle | |
| 5,833,202 A | 11/1998 | Wolfgang | |
| 5,838,478 A | 11/1998 | Hippenmeyer et al. | |
| 5,844,708 A | 12/1998 | Anselment et al. | |
| 5,949,530 A | 9/1999 | Wetteborn | |
| 5,991,011 A | 11/1999 | Damm | |
| 6,088,085 A | 7/2000 | Wetteborn | |
| 6,512,518 B2 | 1/2003 | Dimsdale | |
| 6,563,105 B2 | 5/2003 | Seibel | |
| 6,710,324 B2 | 3/2004 | Hipp | |
| 6,734,849 B2 | 5/2004 | Dimsdale et al. | |
| 6,747,747 B2 | 6/2004 | Hipp | |
| 6,757,467 B1 | 6/2004 | Rogers | |
| 6,759,649 B2 | 7/2004 | Hipp | |
| 6,847,462 B1 | 1/2005 | Kacyra et al. | |
| 6,852,975 B2 | 2/2005 | Riegl et al. | |
| 6,898,218 B2 | 5/2005 | McCarthy | |
| 6,940,554 B2 | 9/2005 | Robins et al. | |
| 6,989,890 B2 | 1/2006 | Riegl et al. | |
| 7,030,968 B2 | 4/2006 | D'Aligny et al. | |
| 7,041,962 B2 | 5/2006 | Dallmann et al. | |
| 7,190,465 B2 | 3/2007 | Froehlich | |
| 7,193,690 B2 | 3/2007 | Ossig et al. | |
| 7,323,670 B2 | 1/2008 | Walsh et al. | |
| 7,345,271 B2 | 3/2008 | Boehlau et al. | |
| 7,453,553 B2 | 11/2008 | Dimsdale | |
| 7,485,862 B2 | 2/2009 | Danziger | |
| 7,486,386 B1 | 2/2009 | Holcombe et al. | |
| 7,589,826 B2 | 9/2009 | Mack et al. | |
| 7,649,617 B2 | 1/2010 | Walsh | |
| 7,697,120 B2 | 4/2010 | Reichert et al. | |
| 7,697,748 B2 | 4/2010 | Dimsdale et al. | |
| 7,701,558 B2 | 4/2010 | Walsh et al. | |
| 7,924,895 B2 | 4/2011 | McCarthy et al. | |
| 7,944,548 B2 | 5/2011 | Eaton | |
| 8,040,525 B2 | 10/2011 | Bridges et al. | |
| 8,059,263 B2 | 11/2011 | Haberer et al. | |
| 8,120,780 B2 | 2/2012 | Bridges et al. | |
| 8,174,682 B2 | 5/2012 | Suzuki | |
| 8,269,982 B1* | 9/2012 | Olczak | G01B 11/162 356/513 |
| 8,406,950 B2 | 3/2013 | Erb et al. | |
| 2003/0066947 A1 | 4/2003 | Alwan et al. | |
| 2006/0219872 A1 | 10/2006 | McVey | |
| 2007/0041083 A1 | 2/2007 | Di Teodoro et al. | |
| 2007/0188735 A1 | 8/2007 | Braunnecker et al. | |
| 2009/0016392 A1 | 1/2009 | Wong | |
| 2009/0142066 A1 | 6/2009 | Leclair et al. | |
| 2009/0316134 A1 | 12/2009 | Michael et al. | |
| 2009/0323074 A1 | 12/2009 | Klebanov | |
| 2010/0007870 A1* | 1/2010 | Haberer | G01S 7/4811 356/5.01 |
| 2011/0246116 A1* | 10/2011 | Kamitani | G01S 7/4865 702/97 |
| 2011/0291017 A1 | 12/2011 | Frach | |
| 2012/0154783 A1 | 6/2012 | Goldberg et al. | |
| 2013/0250273 A1 | 9/2013 | Ludwig | |

* cited by examiner

LIDAR SCANNER

CROSS-REFERENCE TO RELATED APPLICATIONS

This application is a continuation of U.S. patent application Ser. No. 13/826,155, filed on Mar. 14, 2013 and entitled "LIDAR SCANNER," the entirety of which incorporated by reference herein.

BACKGROUND OF THE INVENTIONS

Field of the Inventions

The present application relates to the field of metrology, and particularly to LiDAR sensors and related devices.

Description of the Related Art

The process for measuring distance and reflectance values for objects within an environment without touching those objects is of great interest to many industries including surveying, architecture, entertainment (character generated effects for movies and video games), construction, forensic and geography applications. Historically to collect accurate distance and reflectance measurements one used photogrammetry techniques, but the process for extracting information from stereo imagery is both time consuming and expensive. Over the past decade advances in Light Detecting and Ranging (LiDAR) technology have enabled practitioners to scan large area surfaces while collecting billions of data points, each with a precise latitude, longitude and elevation (x, y, z) values within the local (relative) coordinate system. The aggregate of the billions of data points is referred to as a point cloud data set. Practitioners will subsequently extract objects from the point cloud and then create three dimensional models. Those models are then used in numerous applications. For example within geographic information systems (GIS) industry, practitioners will frequently integrate Global Positioning System (GPS) data into the point cloud to 'geo-reference' it to a global coordinate system. Every data point in a geo-referenced point cloud has an absolute x, y, and z location on the earth's surface.

SUMMARY OF THE INVENTIONS

LiDAR, specifically time-of-flight based LiDAR, is a distance range measurement technique in which a brief laser pulse (e.g. approximately 1-10 nanoseconds pulse width) is emitted and the reflected light is detected while the time between the emitted pulse and reflected pulse is measured. This time of flight of the laser pulse from the time it is emitted until it is reflected back to the LiDAR instrument corresponds to the distance between the LiDAR sensor and the target surface.

The fraction of light reflected by a diffuse (non-shiny) surface is its reflectance. An estimate of the target surface's reflectance can be calculated from the ratio of reflected light received by the LiDAR sensor to the emitted light, given the measured distance to the target.

The direction of the laser can be scanned with a spinning mirror, allowing measurements through a range of angles. Thus, the distance to various objects can be measured over a range of angles.

Time to digital converters ("TDC") or time measurement units ("TMU") can be used to make precise time measurements between two electrical events (like pulse edges) and report that time in a digital electronic format. In some embodiments, a TDC chip can achieve a time measurement precision of 10 picoseconds. A TDC can be used to measure the time of flight of a laser pulse for LiDAR distance measurement. Accounting for the speed of light, a time measurement precision of approximately 10 picoseconds would correspond to a distance measurement precision of approximately 1.5 mm. White papers have been published describing the implementation of TDC designs in low cost field programmable gate array chips. While a dedicated TDC chip may cost over $200, a field programmable gate array chip may cost less than $40.

In some embodiments, a LiDAR sensor can include a laser, a directional sensor, a window, an electromagnetic pulse receiving sensor, and a processor. The laser can be configured to emit a narrow electromagnetic pulse. Further, the directional sensor can be configured to measure the direction of the narrow electromagnetic pulse emitted by the laser. The narrow emitted electromagnetic pulse can pass through the window. The pulse can then be reflected by at least the window and an object external from the LiDAR sensor, creating at least two reflected pulses. The electromagnetic pulse receiving sensor can be configured to measure the two reflected pulses resulting from the narrow pulse emitted by the laser. The processor can be configured to receive information from the sensors, indicating a position of the object relative to the LiDAR sensor. Further, the processor can be configured to measure the intensity of the pulse being reflected by the window.

In a further embodiment, a method of accounting for an unclean or damaged window on a LiDAR sensor is provided. An electromagnetic pulse can be emitted through a window, and a reflection caused by said pulse from the window can be received. This reflected pulse can then have its intensity measured. Similarly, the emitted pulse can be reflected by an external object. Said object reflected pulse can also be received and have its time of receipt measured to indicate a distance from the external object.

In a further embodiment, a LiDAR sensor can include a laser, a directional sensor, an electromagnetic pulse receiving sensor, and a processor. The laser can be configured to emit a narrow electromagnetic pulse. Further, the directional sensor can be configured to measure the direction of the narrow electromagnetic pulse emitted by the laser. The pulse can be reflected by an object external from the LiDAR sensor to create a reflected pulse. The electromagnetic pulse receiving sensor can be configured to measure this reflected pulse. The processor can then be configured to determine a time of receipt of the reflected pulse according to an estimated time of a peak intensity of the pulse. The estimated time of the peak can be when a time derivative of the intensity of the reflected pulse declines below a threshold rate. This time of receipt can be indicative of a distance from the object.

In a further embodiment, a method of operating a LiDAR sensor is provided. An electromagnetic pulse can be emitted to cause a reflected electromagnetic pulse. The reflected pulse can be received and a signal indicative of a time derivative or slope of the intensity of the pulse can be produced. The signal indicative of the time derivative or slope can be compared with a reference slope, and a peak detected signal can be outputted when the signal indicative of the time derivative or slope passes the reference slope. The time of the peak detected signal can be measured to indicate a time of receipt of the reflected electromagnetic pulse from the object. Further, the time of receipt of the reflected electromagnetic pulse can indicate a distance from the object.

BRIEF DESCRIPTION OF THE DRAWINGS

These and other features, aspects, and advantages of the invention disclosed herein are described below with reference to the drawings of preferred embodiments, which are intended to illustrate and not to limit the invention. Additionally, from figure to figure, the same reference numerals have been used to designate the same components of an illustrated embodiment. The following is a brief description of each of the drawings.

DETAILED DESCRIPTION OF THE PREFERRED EMBODIMENTS

Figure 1:
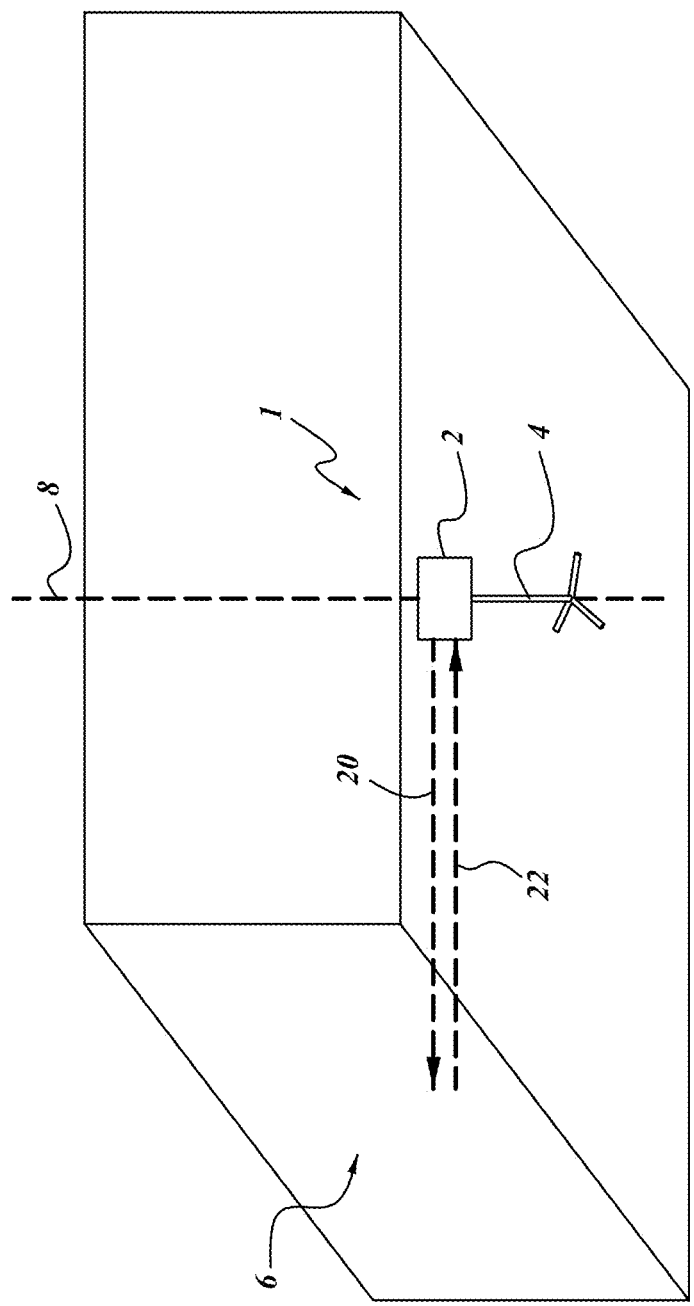
FIG. 1 depicts an embodiment position sensing device.

FIG. 1 depicts an embodiment position sensing device 1. The position sensing device is shown in an arbitrary environment, depicted as a walled room. However, it will be understood that the position sensing device 1 can be used in other environments such as a construction site, a mine, a laboratory, or other indoor and outdoor environments. The position sensing device 1 can be configured to measure at least one point, or further at least one spatial map of a portion of the environment, such as an object 6 in the room. For example, in the context of the room, the object 6 measured by the position sensing device 1 can be one or more walls of the room. In some embodiments the position sensing device 1 can measure a particular set of separate and discrete points, whereas in further embodiments the position sensing device 1 can measure a continuous span of points, as will be described further below. The measurement can be made using an electromagnetic pulse 20 (further described below), such as a light pulse. However, it will be understood that other mechanisms can be used, such as other pulses along the electromagnetic spectrum, sound waves, and other forms of directional energy. The pulse 20 can be reflected by the object 6 to form an object reflected pulse 22, which can be used by the sensor 2 to determine a position of the object 6 according to a time of arrival of the reflected pulse 22 relative to the time of the initial pulse 20.

As further shown, the position sensing device 1 can include a sensor 2 mounted on a base 4. The base 4 is depicted as a tripod. In many embodiments, it will be desirable to use a base 4 that is substantially stable, as movement of the positioning device 1 during operation can add error to measurements provided by the position sensing device 1. In other embodiments the sensor 2 can be mounted on other objects, such as a vehicle (e.g., car, plane, bicycle), human-carried object (e.g., on a helmet, backpack, or handle), or the like. Further, it will be understood that the sensor 2 can be usable separate from the base 4 or another mount. For example, some embodiments of the sensor 2 can include a flat bottom such that it can be placed directly on the ground, a table, or another surface. Further embodiments of the sensor 2 can be configured to be held directly by a user.

As noted above, the sensor 2 can be configured to measure a continuous span of points. In some embodiments, this can be best described as an angular span relative to the sensor 2. For example, in some embodiments the sensor 2 can have rotatable elements, such that it can sequentially take measurements over a span of angles. In some embodiments, this span of angles can be defined by a rotation about a single primary axis of rotation 8. As shown in FIG. 1, the axis of rotation 8 can be substantially vertical and aligned with the base 4. The sensor 2 can be configured to rotate about this axis of rotation 8, measuring the distance to one or more objects 6 along the angular span. In further embodiments, the sensor 2 can also measure in angular spans rotating vertically, outside a plane perpendicular to the axis of rotation 8. In embodiments where the sensor 2 can measure along angular spans in both directions, the sensor 2 will potentially be able to measure substantially all objects 6 in its environment, measuring at substantially every combination of angles. However, it will be understood that the angular spans measurable by the sensor 2 may be limited by certain components of the sensor itself which may create blindspots. Nevertheless, in such embodiments substantially all of the environment can still be measured by the sensor 2.

Figure 2:
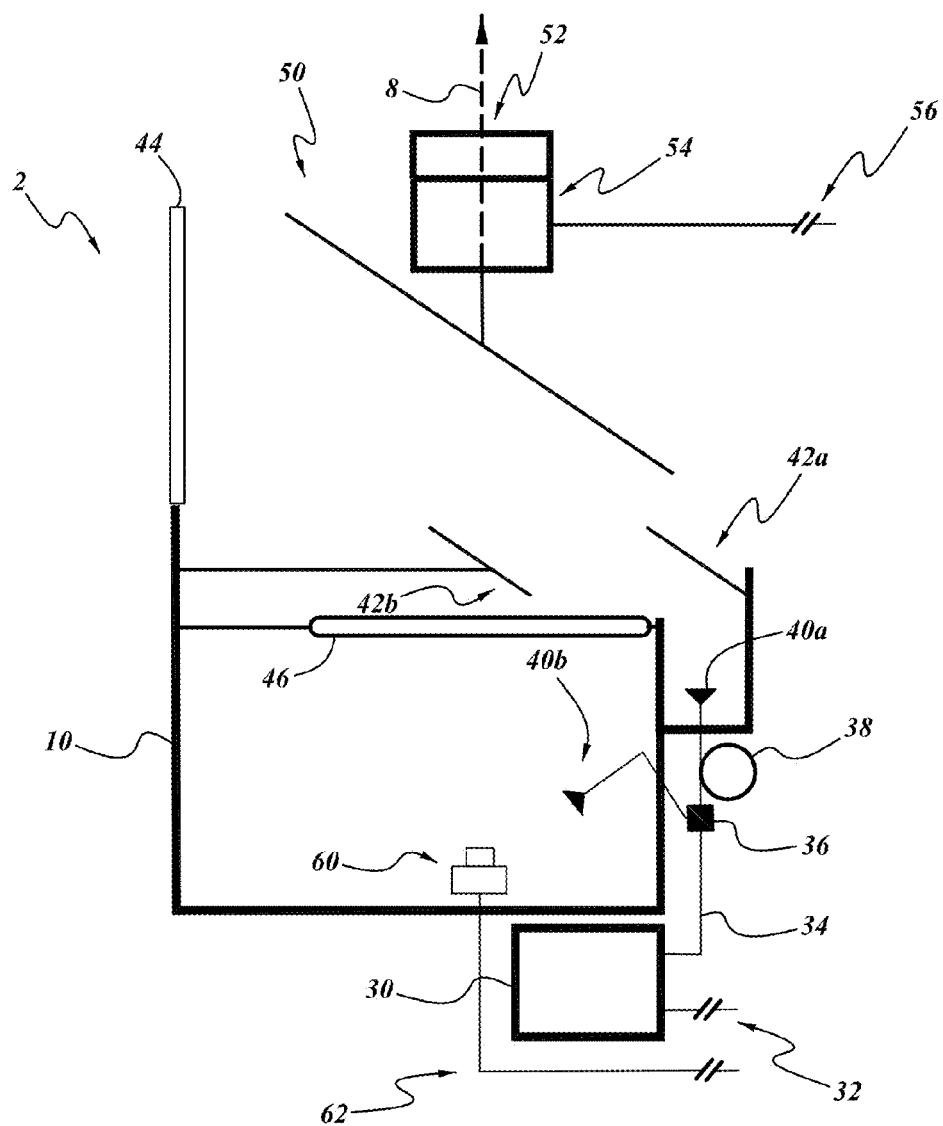
FIG. 2 depicts an embodiment LiDAR sensor usable with the position sensing device of FIG. 1.

FIG. 2 depicts an embodiment of a sensor 2 configured to measure position. The sensor 2 is depicted as including a housing 10 that can hold a variety of the components of the sensor. For example, a fiber laser 30 can be mounted to the housing 10, e.g., at a bottom portion. The fiber laser 30 can be configured to emit a laser beam, although a wide variety of other forms of energy can be used (as discussed above). The laser beam can be emitted from the fiber laser 30 as a substantially short and discrete pulse of energy. Power for the fiber laser 30 can be provided by a power and communication cable 32. This cable can additionally provide communication with the fiber laser 30, and thus can control the timing and form of pulses emitted by the fiber laser 30.

In some embodiments, the emitted pulse from the fiber laser 30 can proceed directly out of the sensor 2, and into the external environment toward the measured object 6. However, in other embodiments it may be desirable to redirect and/or reform the emitted pulse within the sensor 2 to allow greater flexibility in functionality and packaging of components in the sensor 2. For example, in the depicted embodiment, the emitted pulse from the fiber laser 30 is redirected and split prior to exiting the sensor 2.

As shown, in FIG. 2, the fiber laser 30 outputs the emitted pulse to a fiber cable 34, which redirects the emitted pulse. The emitted pulse can then enter a fiber cable splitter 36. The fiber cable splitter 36 can separate the emitted pulse into a plurality of separate pulses each having a controllable portion of the intensity of the emitted pulse. In the present embodiment, the pulse can be split into two separate pulses, further shown in FIG. 3.

Figure 3:
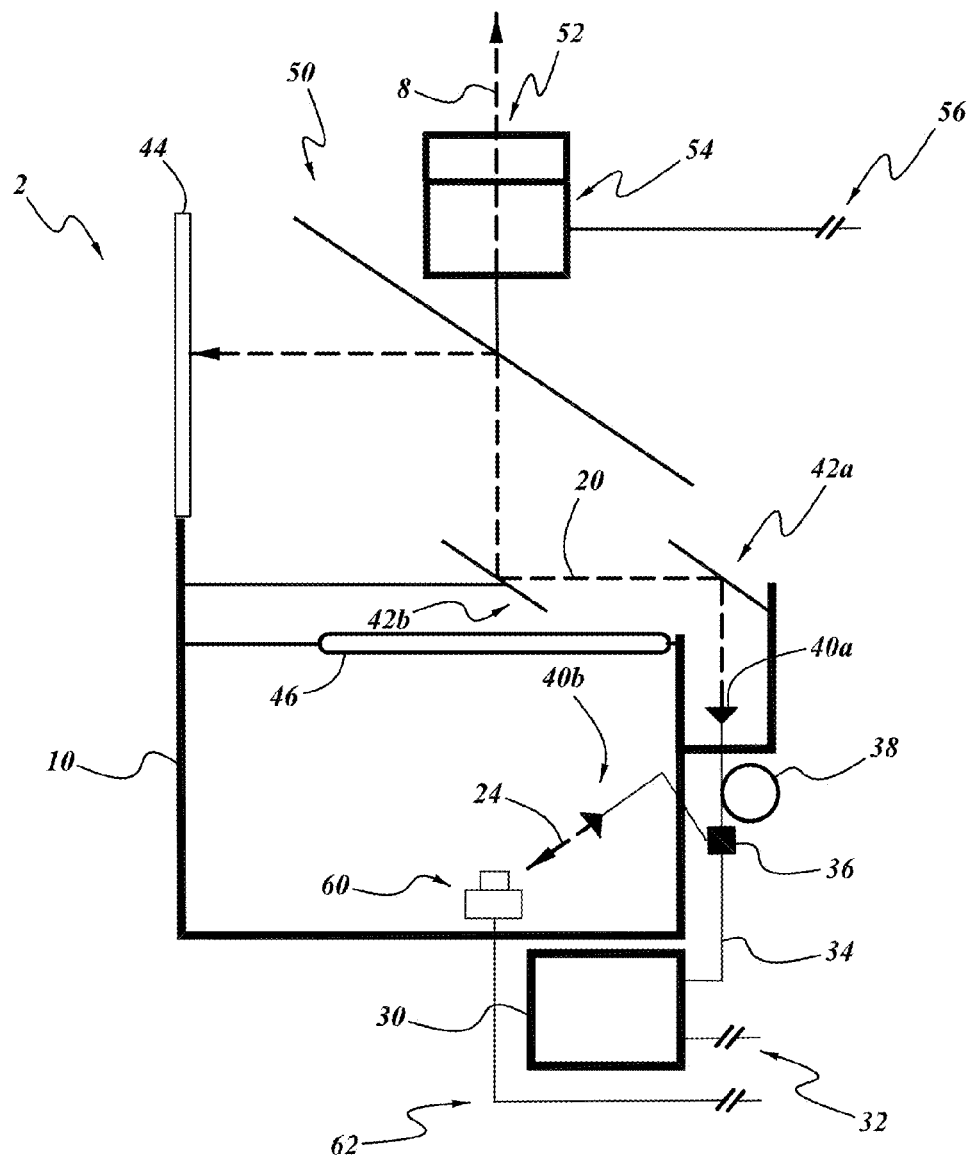
FIG. 3 depicts the LiDAR sensor of FIG. 2, with an emitted pulse.

As shown in FIG. 3, one portion of the emitted pulse from the fiber laser 30 can be a calibration pulse 24. The calibration pulse 24 can be directed from the fiber cable splitter 36 to a pulse receiving sensor 60. In some embodiments, the calibration pulse can additionally be concentrated toward the pulse receiving sensor 60, such as with a collimator lens 40B which can straighten the beam.

Figure 7:
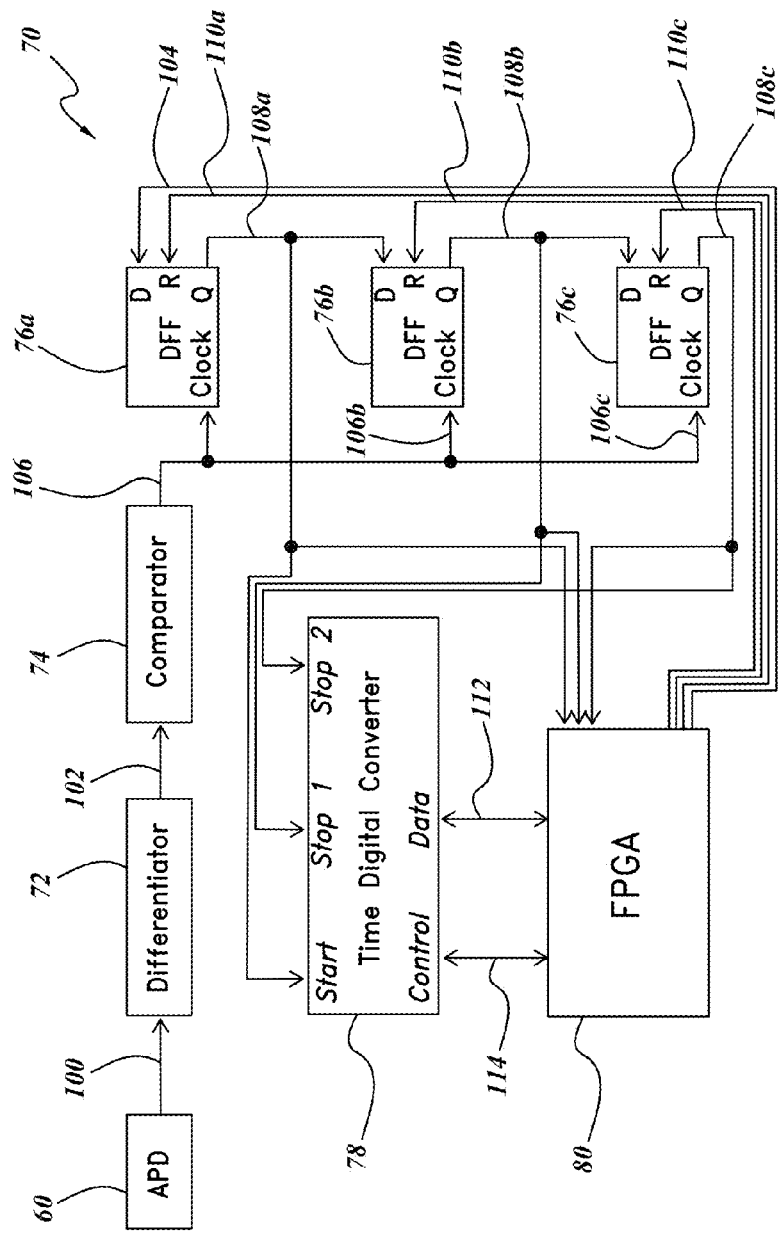
FIG. 7 depicts embodiment electronics associated with the LiDAR sensor of FIG. 2.
Figure 9:
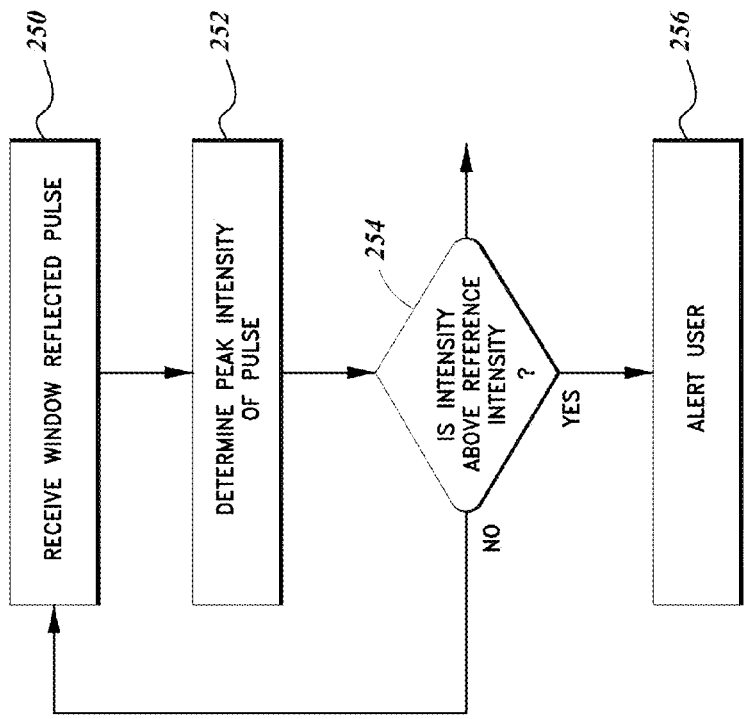
FIG. 9 depicts an embodiment method for alerting a user of an unclean or damaged window.

The pulse receiving sensor 60 can be configured to produce a signal upon receiving the calibration pulse 24. For example, in some embodiments the pulse receiving sensor 60 can be a photoelectric transducer, such as an avalanche photodiode ("APD") as shown in FIG. 7. Further, in some embodiments the output from the pulse receiving sensor 60 can be amplified, such as with a transimpedance amplifier. However, it will be understood that other pulse receiving sensors 60 can be used, such as a microphone in embodiments where the pulses are sound waves. Output from the pulse receiving sensor 60 can be processed, as further described below.

As further shown in FIG. 3, a second portion of the emitted pulse from the fiber laser 30 can be an output pulse 20. The output pulse 20 can be directed from the fiber cable splitter 36 to the external environment using one or more elements to redirect and reform the output pulse as desired. For example, in the depicted embodiment the output pulse 20 can first pass through a fiber cable delay loop 38. The fiber cable delay loop 38 can include a long wound fiber cable forming an extended path for the pulse 20 to travel through. This can advantageously extend the travel time of the output pulse 20. This extended travel time can advantageously provide a delay between the calibration pulse 24 and a window reflected pulse 26 (further described below). This extended time between pulses can facilitate signal processing by a processor 70, which is further described below.

After the fiber cable delay loop 38, the output pulse 20 can pass through a main collimator lens 40A configured to straighten a beam of the output pulse. From the collimator lens 40A, the output pulse can then be redirected by a series of mirrors. As shown, the output pulse 20 can be initially directed vertically until it is reflected from a first fixed mirror 42A. The fixed mirror 42A can redirect the output pulse 20 horizontally, toward a second fixed mirror 42B. The second fixed mirror 42B can then redirect the output pulse 20 back vertically, toward a spinning mirror 50.

The spinning mirror 50 can be configured to redirect the output pulse 20 toward an exterior window 44. The output pulse 20 can then proceed through the window 44 to an external environment and be reflected, as further described below. The spinning mirror can be connected to a mirror motor 54 configured to spin the mirror 50 about a primary axis of rotation 8. Spinning the mirror 50 can then cause the output pulse 20 to rotate about the primary axis of rotation 8. Advantageously, the exterior window 44 can be substantially circular, such that the output pulse 20 can pass through the window as the spinning mirror 50 redirects the output pulse at different angles. As shown, the output pulse 20 can be redirected about the horizontal plane, relative to the sensing device 1. Thus, the output pulse 20 can allow measurement by the sensor 2 along a 360 degree arc about the position sensing device 1. In further embodiments the spinning mirror 50 can be configured to rotate about a secondary axis, allowing the output pulse 20 to be directed vertically relative to the sensing device 1, allowing the sensor 2 to measure in substantially all directions.

The spinning mirror 50 can additionally include an angular sensor such as an encoder 52. The angular sensor 52 can measure an angular position of the spinning mirror 50 (e.g., by measuring the position of the motor 54). This angular position can be outputted by the angular sensor 52, to indicate the angular position of a measurement provided by the output pulse 20, as further discussed below. The output from the sensor 52 can be provided along a mirror motor and communication cable 56. The cable can additionally provide power and control to the mirror motor 54, e.g. from a processor 70.

Figure 4:
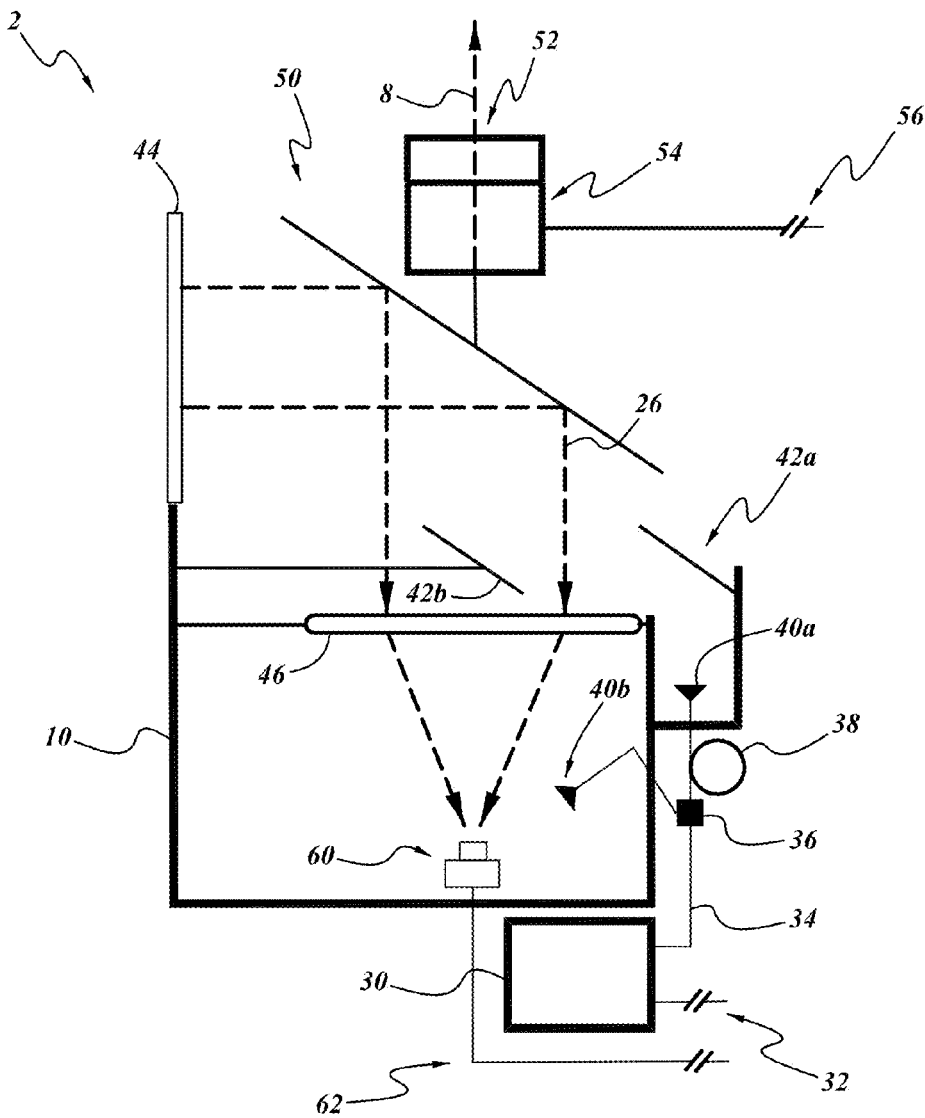
FIG. 4 depicts the LiDAR sensor of FIG. 3, with a first reflected pulse.
Figure 6:
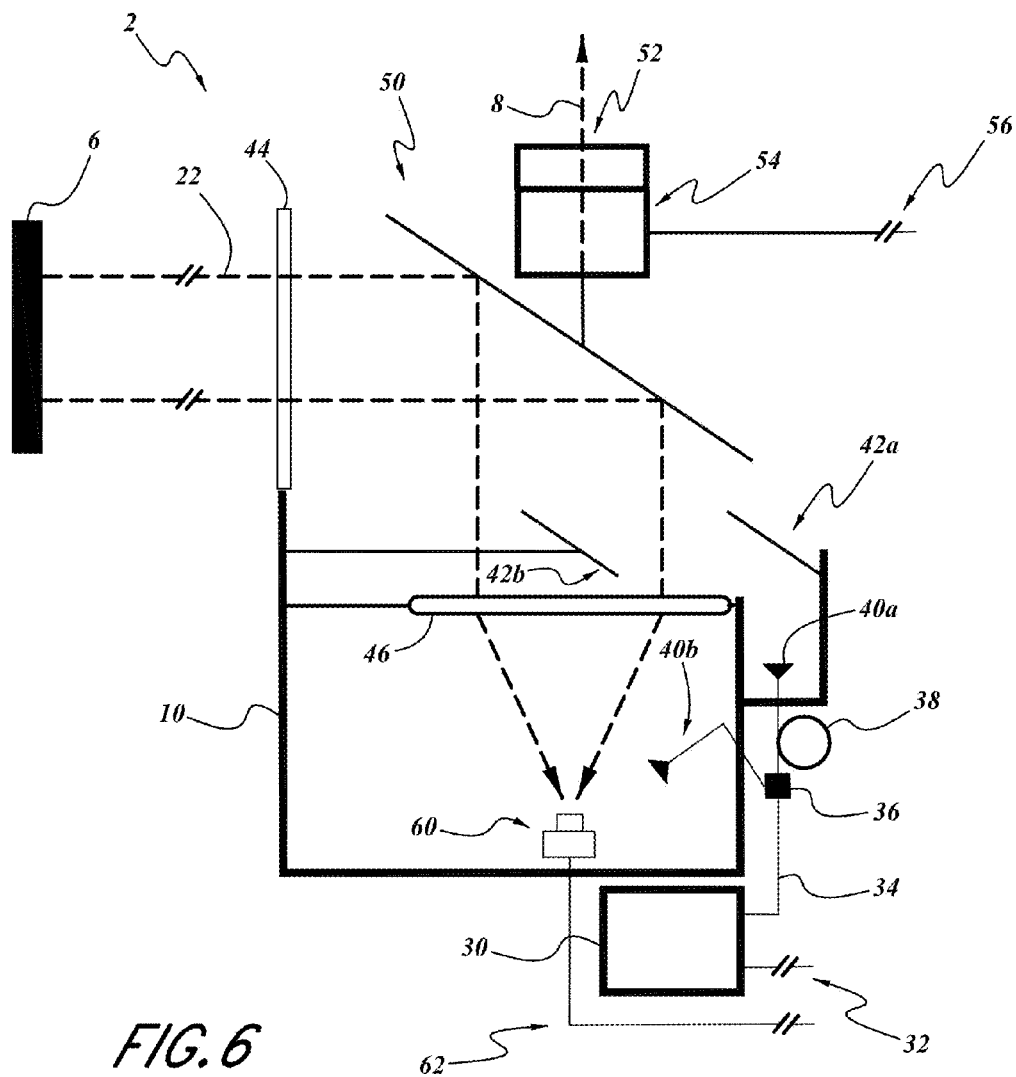
FIG. 6 depicts the LiDAR sensor of FIG. 2, with a second reflected pulse.

As will be further described below, reflected pulses 22, 26 caused by the output pulse 20 are depicted in FIGS. 4 and 6. The reflected pulses 22, 26 can return through or from the window 44 toward the spinning mirror 50. The spinning mirror 50 can then redirect the reflected pulses 22, 26 downward, toward the pulse receiving sensor 60. In some embodiments, the spinning mirror 50 can be substantially larger than the second fixed mirror 42B. Further, as shown, the fixed mirror 42B can be positioned between the spinning mirror 50 and the pulse receiving sensor 60. It will be understood that the width of the pulses 20, 22, 26 can gradually expand during their time of flight, such that the reflected pulses 22, 26 can be broader than the output pulse 20. In the depicted embodiment, the reflected pulses 22, 26 can be sufficiently broad such that a sufficient proportion of the reflected pulses are not shaded by the narrower second fixed mirror 42B. An optical lens 46 can be positioned between the spinning mirror 50 and the pulse receiving sensor 60 to focus the broader reflected pulses 22, 26 toward the sensor. The sensor can then output a signal in response to these reflected pulses 22, 26 (or the calibration pulse 24) along a cable 62.

The process of measuring position is now described in reference to FIGS. 2-9. As depicted in FIG. 2 and further described above, the fiber laser 30 can emit a pulse upon instructions provided through the associated power and communication cable 32. In some embodiments, the power and communication cable 32 can be communicatively linked to a processor, such as the processor 70 depicted schematically in FIG. 7. The processor 70 can be configured to control the fiber laser 30 to control the time and nature of the emitted pulse.

In some embodiments, the processor 70 can be one or more electrical components on a general purpose computer, which may be operatively connected to the position sensing device 1 (e.g., with a wired or wireless connection). In other embodiments the processor 70 can be one or more electrical components provided on the position sensing device (e.g., on the sensor 2, within the sensor housing 10). Further, in some embodiments the processor 70 can include the one or more electrical components on one or more printed circuit boards. It will be understood that the processor 70 can be configured to provide additional functionality beyond that explicitly described herein.

As shown in FIG. 2 and discussed above, the emitted pulse can be split by the fiber cable splitter 36 into two separate pulses: a calibration pulse 24 and an output pulse 20. The calibration pulse 24 can be transmitted substantially directly to the pulse receiving sensor 60. The calibration pulse 24 can thus arrive at the pulse receiving sensor 60 first, providing a reference time indicative of the time that the pulse from the fiber laser 30 was initially emitted. In some embodiments, the fiber cable splitter 36 can be configured to make the calibration pulse 24 much smaller than the output pulse 20. For example, in some embodiments the calibration pulse 24 can be approximately 1% of the emitted pulse and the output pulse 20 can be approximately 99% of the emitted pulse. In other embodiments, the calibration pulse 24 can be made approximately only as large a proportion of the emitted pulse as is necessary to reliable be detected by the pulse receiving sensor 60 and the associated components, as discussed below.

Figure 8:
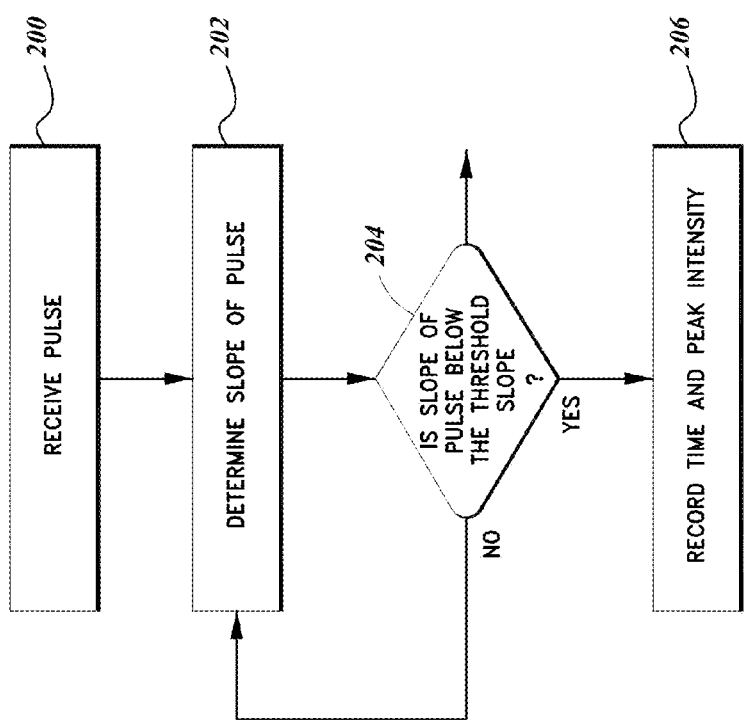
FIG. 8 depicts an embodiment method for recording a time and peak intensity of a pulse.

As shown in FIG. 7, the pulse receiving sensor 60 can output a signal 100 upon receiving the calibration pulse 24. In some embodiments the signal 100 from the sensor 60 can be an analog electrical signal, such as the output from a photodiode. However, in other embodiments the signal can take other forms, such as a digital signal. This reception of the calibration pulse 24 can be represented as block 200, as depicted in FIG. 8.

The signal 100 from the pulse receiving sensor 60 can be received by a differentiator 72. The differentiator 72 can be an analog differentiator circuit, configured to output a time derivative of the signal 100 from the pulse receiving sensor 60. This signal 100 can have an intensity (e.g., amplitude, voltage, etc.) that can be indicative of the intensity of the received calibration pulse 24. Thus, the output of the differentiator 72 can indicate a time derivate of the intensity of the calibration pulse 24. This production of a signal indicating a time derivative (or slope) of the intensity of the calibration pulse 24 can be represented as block 202, as depicted in FIG. 8.

The output of the differentiator 72 can be a slope signal 102 that, like the other signals described herein, can be an analog signal, a digital signal, an electrical signal, or the like. The slope signal 102 can be received by a comparator 74. The comparator 74 can be a comparator circuit such as an analog comparator circuit. In some embodiments, the comparator 74 can be configured to output a high intensity signal when the input (e.g., the slope signal 102) descends below a reference intensity (corresponding to a reference slope). As discussed above, the intensity of the slope signal 102 can be indicative of a time derivative of the intensity of the calibration pulse 24. Thus, the comparator 74 can output a high intensity signal when the time derivative of the intensity of the calibration pulse 24 falls below a certain value, such as the reference intensity (corresponding to a reference slope).

In some embodiments, the comparator 74 can be set to output a high intensity signal when the time derivative of the intensity of the calibration pulse 24 indicates that a peak or maximum intensity of the calibration pulse 24 has been reached. For example, the comparator 74 can indicate when the time derivative reaches approximately zero, indicating a possible peak. In other embodiments, the comparator 74 can indicate when the time derivative falls slightly below zero, preventing some noise in the signal from indicating a false peak when the intensity is actually still rising. The analysis of whether these conditions have been met (e.g., if the reference intensity has been met) can be represented as block 204, as depicted in FIG. 8. If the reference intensity is not met, the slope can continue to be output by the differentiator 72 and processed by the comparator 74.

Thus, the combination of the differentiator 72 and the comparator 74 can combine to form an element (e.g., an entirely analog circuit) able to output a signal indicative of the time of maximum or peak intensity of the calibration pulse 24. This time of maximum or peak intensity can define a time of arrival of the pulse. In other embodiments, alternative elements can be used to identify a time of arrival of the pulse. For example, in some embodiments a processing unit can measure an entire waveform of the pulse and compute a particular time (e.g., a peak time) by analyzing the complete wave form of the pulse. However, these elements may be more expensive than those used in other embodiments. As another alternative, the time of arrival of the pulse can be identified by measuring when an intensity of the pulse passes a particular threshold value. If the threshold value is reached during the pulse, the pulse will initially rise passed the threshold value and then descend back passed the threshold value. A peak time can then be calculated as a time between the two times the threshold value was passed. However, these elements might miss low intensity pulses that do not reach the threshold value. It will also be understood that any of these methods of analysis can be used with other electrical components. For example, in some embodiments a general purpose computer can compute a slope and compare it to a reference intensity in a similar manner.

The time and peak intensity of the calibration pulse 24 can then be recorded, as described below, and represented in block 206 of FIG. 8. The outputted signal indicative of the time of arrival of the calibration pulse 24 can be a first peak detect signal 106A. In some embodiments, the first peak detect signal 106A can be directly sent to an electronic timing module configured to record a time of arrival of the calibration pulse 24. However, in the depicted embodiment the time of arrival can be provided indirectly. As shown in FIG. 7, the first peak detect signal 106A can be provided to a first signal D-type flip flop ("DFF") 76A. FIG. 7 additionally indicates that the first peak detect signal 106A may also be provided to second and third DFFs 76B, 76C. However, the processor 70 can be configured such that the first peak detect signal 106A does not activate the second and third DFFs 76B, 76C, as will be further described below.

The first DFF 76A can additionally receive a first pulse enable signal 104. The first pulse enable signal 104 can act as a D-input to the first DFF 76A and the first peak detect signal 106A can act as a clock input. The first pulse enable signal 104 can be provided from a sub-level processor 80, such as a field-programmable gate array ("FPGA"), configured to enable the first DFF 76A at a desired time. For example, in some embodiments the first DFF 76A will be enabled only upon emission by the fiber laser 30 (which can also be controlled by the sub-level processor 80, via the fiber laser's power and communication cable 32, connection not shown in FIG. 7). Thus, exogenous pulses received by the sensor 2 can be ignored if not timed to coincide with an emitted pulse from the fiber laser 30.

Thus, when the first DFF 76A is enabled with a first pulse enable signal 104 at its D-input (e.g., by the sub-level processor 80), receipt of the first peak detect signal 106A at the clock input can cause the first DFF 76A to continuously output a first pulse detected signal 108A. Notably, this first pulse detected signal 108A can persist after the first peak detect signal 106A has dissipated. The first pulse detected signal 108A can be received by a time digital converter ("TDC") 78. In some embodiments, the TDC 78 can be configured to record time at a high accuracy (e.g., at sub-nanosecond resolution, at approximately 1 to 10 picosecond resolution, or at sub-picosecond resolution). Further, in some embodiments the TDC can use the first pulse detect signal 108A as a start signal, beginning the timing of a clock. As will be further described below, the TDC 78 can subsequently receive signals indicating the time of arrival of other pulses, and measure their time of arrival relative to the time of the start signal. Thus, the TDC 78 in the depicted embodiment can act as a relative clock, recording the time of each pulse relative to the time of the calibration pulse 24, as represented by the first pulse detected signal 108A. However, in other embodiments an absolute clock system can be used, wherein the time of the calibration pulse 24 can be recorded as an absolute time, and compared with the absolute times of the remaining pulses. Even further, in some embodiments no calibration pulse is used and the time of emission of the fiber laser 30 (e.g., as represented by a time the fiber laser is commanded to emit by the sub-level processor 80) can be used as a reference time similar to the calibration pulse 24.

The first pulse detected signal 108A can additionally be received at the D-input of the second DFF 76B, thus enabling the DFF 76B. The second DFF 76B can now measure the time of a window reflected pulse 26, depicted in FIG. 4. As shown in FIG. 4, the window reflected pulse 26 can be produced at the exterior window 44. The window 44 can be imperfectly transparent, such that not all of the output pulse 20 proceeds directly through the window. A portion of the output pulse 20 can be absorbed by the window 44, and further a portion of the output pulse can be reflected back by the window as a window reflected pulse 26.

Notably, the intensity of the window reflected pulse 26 can vary with the quality and condition of the window 44. For example, an unclean, scratched, dented, or otherwise degraded window 44 will usually have a higher intensity reflected pulse 26. Such degradations to the window 44 can also reduce the intensity of the object reflected pulse 22, which results from the output pulse 20 (which is reduced by the degradations on the window) and passes through the window on its return to the sensor 2 (reducing the intensity again). Thus, as further described below, the intensity of the window reflected pulse 26 can be used to calibrate measurements of intensity of the object reflected pulse 22 and further indicate a condition of the window 44 to a user.

The window reflected pulse 26 can reflect from the spinning mirror 50 and pass through the optical lens 46 to the pulse receiving sensor 60, as described above and depicted in FIG. 4. The time of arrival of the mirror reflected pulse 26 can then be represented in a manner similar to the time of arrival of the calibration pulse 24, as described above. Thus, a second peak detect signal 106B can be outputted by the comparator 74. Like the first peak detect signal 106A, the second peak detect signal 106B can be received by each of the DFFs 76. However, the first DFF 76A can already be activated, and thus can be substantially unaffected by the second peak detect signal 106B. Further, the third DFF 76C can be unenabled at its D-input, and thus also be unaffected by the second peak detect signal 106B. However, the second DFF 76B can be enabled at its D-input by the first pulse detected signal 108A. Thus, receiving the second peak detect signal 106B at the clock input of the second DFF 76B can cause the second DFF to continuously output a second pulse detected signal 108B.

The second pulse detected signal 108B can be received by the TDC 78. The TDC 78 can then output or record the time of the second pulse detected signal 108B. For example, the time can be a relative time, since the start signal provided by the first pulse detected signal 108A, as described above. Alternatively, the time can be an absolute time, as described above.

Figure 5:
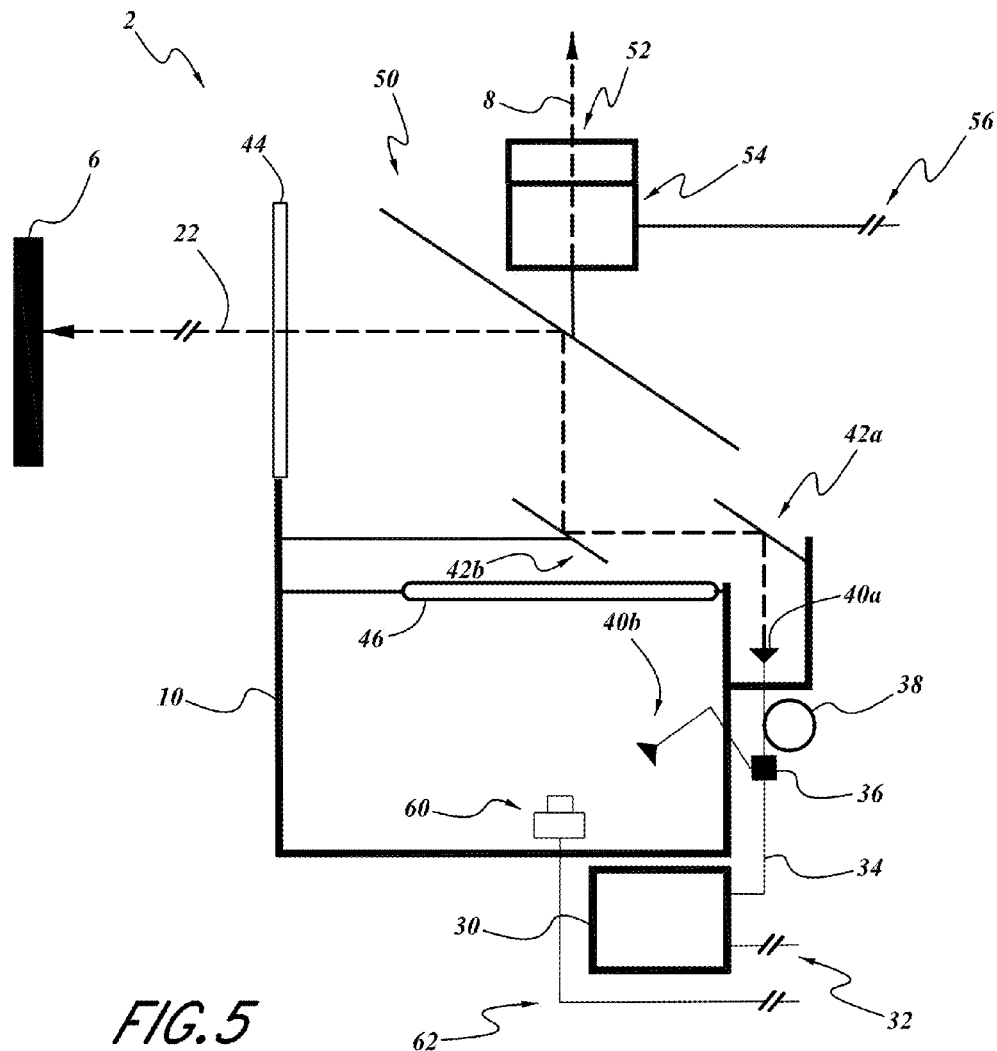
FIG. 5 depicts the LiDAR sensor of FIG. 2, with an extended emitted pulse.

The second pulse detected signal 108B can additionally be received at the D-input of the third DFF 76C, thus enabling the DFF 76C. The third DFF 76C can now be used to measure the time of an object reflected pulse 22, depicted in FIGS. 5 and 6. As shown in FIG. 5 and discussed above, a substantial portion of the output pulse 20 can proceed through the window 44 to an object 6. The object 6 can have a reflectance such that an object reflected pulse 22 returns to the sensor 2, through the window 44, as shown in FIG. 6. The object reflected pulse 22 can then reach the pulse receiving sensor 60 and produce a third peak detect signal 106C in a manner similar to that describe above regarding the calibration pulse 24 and the window reflected pulse 26.

The third peak detect signal 106C can be received by each of the DFFs 76. However, the first and second DFFs 76A, 76B can be substantially unaffected because they are already activated. The third DFF 76C can be enabled by the second pulse detected signal 108B. Thus, the third peak detect signal 106C can cause the third DFF 76C to output a third pulse detected signal 108C. The third pulse detected signal 108C can be received by the TDC 78, which can record or output the time in a manner similar to that described above regarding the second pulse detected signal 108B (e.g., relative to the first pulse detected signal 108A, or an absolute time). In some embodiments, receipt of the third pulse detected signal 108C can cause the TDC to output its data and reset.

The data output by the TDC 78 can be indicative of a distance between the sensor 2 and the object 6. For example, the pulses 20, 22, 24, 26 can travel at a known speed (e.g., the speed of light). Thus, the time the pulse takes to reach the object and be reflected back (e.g., the time taken by the output pulse 20 and the object reflected pulse 22) can be proportional to the distance between the sensor 2 and the object 6. The time the calibration pulse 24 is received can provide approximate reference start time for the output pulse 20, less a fixed time offset of at least the length of the fiber cable delay loop 38 divided by the speed of light in the fiber cable delay loop. In some embodiments, this time can be more reliable than a time when the fiber laser 30 is commanded to emit a pulse (which can also be recorded in some embodiments). The sensor 2 (e.g., the processor 70) can be further calibrated to account for any offset between the distance implied from the time of the calibration pulse 24 (as compared with the time of the object reflected pulse 22) and a true distance to the object 6. Similar operations can use the time of the window reflected pulse 26 to calibrate the sensor 2, which should be received at a consistent time after the calibration pulse 24.

Advantageously, a sub-level processor 80, such as an FPGA, can provide additional functionality. For example, as shown, the sub-level processor 80 can receive each of the pulse detected signals 108. In some embodiments, the sub-level processor 80 can receive time data 112 from the TDC 78 upon receiving each of the pulse detected signals 108. In other embodiments, the sub-level processor 80 can be configured to receive time data 112 from the TDC 78 only upon receipt of the third pulse detected signal 108C. In further embodiments, the sub-level processor 80 can be configured to request time data 112 from the TDC 78 upon receipt of the third pulse detected signal 108C. Even further, in some embodiments the sub-level processor 80 can reset the TDC 78 with a TDC control signal 114 upon receipt of the third pulse detected signal 108C. Further, the sub-level processor 80 can provide pulse detected reset signals 110 to each of the DFFs 76, to reset the DFFs to a deactivated state so they can receive a new set of pulses. For example, an emitted pulse from the fiber laser 30 can be provided after the spinning mirror 50 is rotated to a new angle by the mirror motor 54.

As noted above, the sub-level processor 80 can additionally be communicatively connected to the fiber laser 30 via the power and communication cable 32. The sub-level processor 80 can thus control when the fiber laser 30 emits a pulse. In some embodiments, the sub-level processor 80 can enable the first DFF 76A when causing the fiber laser 30 to emit a pulse.

Further, the sub-level processor 80 can be communicatively connected to one or more peak measurement elements, such as a peak measurement circuit. The peak measurement elements can be communicatively connected to the pulse receiving sensor 60 to receive the signal from the sensor indicating the intensity of a received pulse. Upon receiving the signal, the peak measurement elements can store data representative of a peak intensity of the signal. Such peak intensity data can be used for a variety of purposes. For example, the peak intensity of the object reflected pulse 22 can indicate reflective properties of the object 6 such as its material, smoothness, shape, etc. In particular, the ratio of the peak intensity of the object reflected pulse 22 to the peak intensity of the calibration pulse 24 can be calibrated to provide an estimate of the surface reflectance of the object 6.

Further, this reflectance estimate can be corrected or improved using the window reflected pulse 26. As discussed above, imperfections on the window 44 can reduce the intensity of the object reflected pulse 22 when received by the pulse receiving sensor 60. The extent of these imperfections on the window 44 can be at least partially measured by measuring the intensity of the window reflected pulse 26. The measured intensity of the object reflected pulse (and the estimated reflectance of the object 6) can then be calibrated using the intensity of the window reflected pulse 26. For example, in some embodiments the estimated reflectance of the object 6, as measured by the intensity of the object reflected pulse 22, can be proportionally increased according to the intensity of the window reflected pulse 26.

Even further, as discussed above, the intensity of the window reflected pulse 26 can indicate the condition of the window 44. If the window 44 becomes overly unclean or damaged, the accuracy and reliability of the sensor 2 is diminished. In some embodiments, when a window reflected pulse 26 is received (block 250 in FIG. 9) the intensity of the peak of this pulse can be determined (block 252 in FIG. 9). The intensity of the peak can be compared with a threshold level or intensity (block 254 in FIG. 9). When the intensity of the window reflected pulse 26 reaches the threshold level, the sensor 2 can provide an alert to a user (block 256 of FIG. 9). The alert can come in a variety of forms, such as a visual display (LED light, text message on a monitor, etc.), an audible sound, or by flagging the output data as potentially inaccurate. This alert can then potentially prompt the user to inspect the window 44 and potentially clean or replace the window.

It will be understood that the intensity of the calibration pulse 24 can provide similar intensity calibration and diagnostic information. For example, if the intensity of the calibration pulse 24 drops below a threshold level, this may indicate problems with more internal components such as the fiber laser 30, the fiber cable 34, the fiber light splitter 36, the pulse receiving sensor 60, or the peak measurement elements. Thus, an alert can similarly be provided to a user.

As noted above, the sub-level processor 80 can be communicatively connected to the one or more peak measurement elements. In some embodiments, two peak measurement elements can be provided. A first peak measurement element can initially be enabled by the sub-level processor 80 to receive a first impulse (e.g., the calibration impulse 24) and store its peak intensity. Upon receiving a first pulse detected signal (e.g., the first pulse detected signal 108A), the sub-level processor 80 can read the peak measurement intensity from the first peak measurement element and enable a second peak measurement element. The second peak measurement element can then receive and store a peak intensity of a second pulse (e.g., the window reflected pulse 26). The sub-level processor 80 can similarly read the peak measurement intensity from the second peak measurement element and reset and enable the first peak measurement element upon receiving a second pulse detected signal (e.g., the second pulse detected signal 108B). A similar process can be used to obtain the intensity of a third pulse (e.g., the object reflected pulse 22), upon receiving a third pulse detected signal.

Using two peak measurement elements in an alternating method, like the one described above, can advantageously allow a single triggering event to both read the data from one peak measurement element and reset/enable another peak measurement element. In some embodiments, using a single peak measurement element may require more complex control methods. Further, in some embodiments the pulses can be received with very little time between each pulse. Thus, it may be difficult to reset and read a single peak measurement element fast enough to ensure it is ready in time to receive a subsequent pulse.

Further, as noted above, the sub-level processor 80 can be communicatively connected to the mirror motor 54 and the angular sensor 52, through the mirror motor & communication cable 56. The sub-level processor 80 can then receive data indicative of the angle of the spinning mirror 50 and control said angle using the motor 54. The sub-level processor 80 can thus cause the spinning mirror 50 to rotate through a span of angles, as described above. Further, the sub-level processor 80 can combine an estimated distance from the timing of the pulses 22, 24, 26 with the measured angle to define a relative position of the measured object 6 relative to the sensor 2.

The processor 70 can further be put in communication with an external computing device (e.g., with a wired or wireless connection). In some embodiments, the processor 70 can then be configured to output the measured data to the external computing device. In some embodiments, the output data can be the raw data received (e.g., the time and intensity of each pulse and the corresponding angle of the spinning mirror). In other embodiments, the output data can be processed data, such as an estimated position and reflectance of the object(s) 6 at a variety of angles. In further embodiments, the processor 70 can receive operating instructions from the external computing device that can optionally be used to control the sensor 2.

Conditional language used herein, such as, among others, "can," "could," "might," "may," "e.g.," and from the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While the above detailed description has shown, described, and pointed out novel features as applied to various embodiments, it may be understood that various omissions, substitutions, and changes in the form and details of the ground contact sensing system, including the sensor components, logical blocks, modules, and processes illustrated may be made without departing from the spirit of the disclosure. As may be recognized, certain embodiments of the systems described herein may be embodied within a form that does not provide all of the features and benefits set forth herein, as some features may be used or practiced separately from others. Additionally, features described in connection with one embodiment can be incorporated into another of the disclosed embodiments, even if not expressly discussed herein, and the prosthetic device having the combination of features still fall within the scope of the invention.

What is claimed is:

1. A LiDAR sensor comprising:
a laser configured to emit an electromagnetic pulse;
a window through which the electromagnetic pulse emitted by the laser passes;
an electromagnetic pulse receiving sensor configured to measure at least two reflected pulses resulting from the electromagnetic pulse emitted by the laser, the at least two reflected pulses comprising a first pulse being reflected by the window and a second pulse being reflected by an object external from the LiDAR sensor; and
a processor configured to receive information from the electromagnetic pulse receiving sensor indicating a position of the object relative to the LiDAR sensor, the processor further configured to measure an intensity of the first pulse and estimate a reflectance of the object based at least in part on the intensity of the first pulse.

2. The LiDAR sensor of claim 1, wherein the processor is further configured to compare the intensity of the first pulse with a reference intensity, the intensity of the first pulse being at least partially indicative of a state of the window.

3. The LiDAR sensor of claim 2, wherein the processor is further configured to indicate to a user when the intensity of the first pulse exceeds the reference intensity.

4. The LiDAR sensor of claim 1, wherein the processor is further configured to measure an intensity of the second pulse.

5. The LiDAR sensor of claim 1, wherein the electromagnetic pulse emitted by the laser is conducted through at least one optical fiber.

6. The LiDAR sensor of claim 5, wherein the electromagnetic pulse emitted by the laser is split among a plurality of optical fibers with a first optical fiber directing a first split pulse through the window, the first split pulse causing the at least two reflected pulses, and a second optical fiber directing a calibration pulse internally toward the electromagnetic pulse receiving sensor.

7. The LiDAR sensor of claim 6, wherein the processor is further configured to compare an intensity of the second pulse to an intensity of the calibration pulse.

8. The LiDAR sensor of claim 6, wherein the processor is further configured to compare the intensity of the first pulse window to an intensity of the calibration pulse.

9. The LiDAR sensor of claim 1, wherein the window substantially protects one or more internal components of the LiDAR sensor from an external environment.

10. The LiDAR sensor of claim 1, wherein the second pulse returns to the LiDAR sensor and is measured by the electromagnetic pulse receiving sensor through the window.

11. The LiDAR sensor of claim 1, wherein the processor is configured to determine when a time derivative or slope of the intensity of the first pulse exceeds a threshold slope.

12. The LiDAR sensor of claim 1, wherein the electromagnetic pulse comprises a laser pulse having a pulse width between 1 and 10 nanoseconds.

13. A method of accounting for an unclean or damaged window on a LiDAR sensor, the method comprising:
emitting an electromagnetic pulse through a window of the LiDAR sensor;
receiving a first reflected pulse caused by the emitted electromagnetic pulse being reflected from the window;
measuring an intensity of the first reflected pulse;
receiving a second reflected pulse caused by the emitted electromagnetic pulse being reflected from an external object;
measuring a time of receipt of the second reflected pulse from the external object to indicate a distance from the external object; and
based at least in part on the intensity of the first reflected pulse, estimate a reflectance of the external object.

14. The method of claim 13, further comprising comparing the intensity of the first reflected pulse with a reference intensity, the intensity of the first reflected pulse being at least partially indicative of a state of the window.

15. The method of claim 14, further comprising indicating to a user when the intensity of the first reflected pulse exceeds the reference intensity.

16. The method of claim 14, wherein the reference intensity is determined in relation to a baseline intensity representative of a reflected pulse from a clean and undamaged window.

17. The method of claim 14, further comprising measuring a pulse reflected by a clean and undamaged window to determine a baseline intensity and using the baseline intensity to determine the reference intensity, the reference intensity being greater than the baseline intensity.

18. The method of claim 13, further comprising measuring an intensity of the second reflected pulse to further estimate the reflectance of the external object.

19. The method of claim 18, wherein estimating the reflectance of the external object comprises adjusting the estimated reflectance of the external object using the intensity of the first reflected pulse.

20. The method of claim 13, wherein measuring the time of receipt of the second reflected pulse comprises determining when a time derivative or slope of the intensity of the second reflected pulse exceeds a threshold slope.

21. The method of claim 13, wherein the electromagnetic pulse comprises a laser pulse having a pulse width between 1 and 10 nanoseconds.

22. A LiDAR sensor comprising:
a laser configured to emit an electromagnetic pulse;
an electromagnetic pulse receiving sensor configured to measure an intensity of a first reflected pulse resulting from the electromagnetic pulse emitted by the laser being reflected from a window, and a second reflected pulse being reflected by an object external from the LiDAR sensor; and
a processor configured to determine a time of receipt of the second reflected pulse according to an estimated time of a peak intensity of the second reflected pulse, the processor being further configured to estimate a reflectance of the object based at least in part on the intensity of the first reflected pulse.

23. The LiDAR sensor of claim 22, wherein the processor is configured to produce a high intensity signal indicating the estimated time of the peak intensity of the second reflected pulse using only analog elements.

24. The LiDAR sensor of claim 23, wherein the processor comprises an analog differentiator circuit configured to output a signal indicating a time derivative of an intensity of the second reflected pulse.

25. The LiDAR sensor of claim 24, wherein the processor comprises an analog comparator circuit configured to receive the signal from the analog differentiator circuit and output the high intensity signal when the signal from the analog differentiator circuit declines below a threshold value.

26. The LiDAR sensor of claim 22, wherein the processor is configured to determine a time of receipt of a calibration electromagnetic pulse and use the time of receipt of the calibration electromagnetic pulse and the second reflected pulse to estimate a distance from the object.

27. The LiDAR sensor of claim 22, wherein the processor is configured to determine the estimated time of the peak intensity at sub-nanosecond resolution.

28. The LiDAR sensor of claim 22, wherein the electromagnetic pulse comprises a laser pulse having a pulse width between 1 and 10 nanoseconds.

* * * * *